W. COURTENAY.
CANS OR VESSELS FROM VULCANIZED FIBER.
No. 193,323.　　　　　　　　　Patented July 24, 1877.
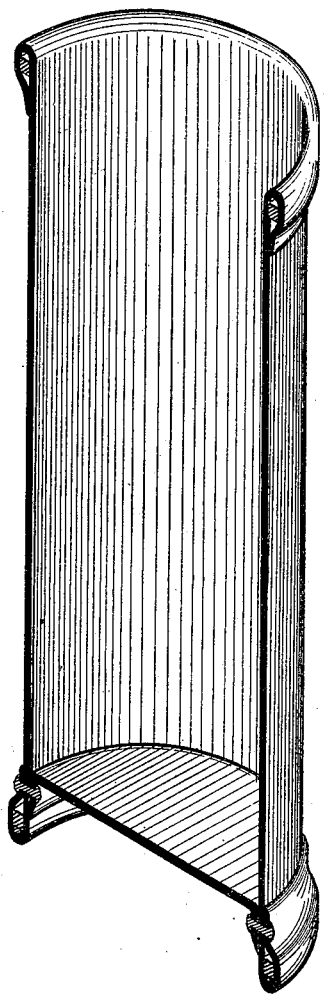
WITNESSES　　　　　　　　　　　　　　　INVENTOR
　　　　　　　　　　　　　　　　　　William Courtenay
　　　　　　　By his Attorneys

UNITED STATES PATENT OFFICE.

WILLIAM COURTENAY, OF NEW YORK, N. Y.

IMPROVEMENT IN CANS OR VESSELS FROM VULCANIZED FIBER.

Specification forming part of Letters Patent No. 193,323, dated July 24, 1877; application filed May 18, 1877.

*To all whom it may concern:*

Be it known that I, WILLIAM COURTENAY, of the city, county, and State of New York, have invented an Improved Tubular Vessel or Can, of which the following is a specification:

The object of my invention is to construct a vessel or can which shall be light, cheap, and durable, while possessing great strength, besides the capacity for resisting oils and acids, and of being rendered impervious to moisture, which ends I attain by making such articles of vulcanized fiber, a substance recently discovered, but now well known in the arts, consisting of fibrous matter treated with chloride of zinc, in accordance with the specifications of Letters Patent of the United States No. 113,454, dated April 4, 1871, and No. 120,380, dated October 31, 1871.

The accompanying drawings represent a vertical section through a roving-can made in accordance with my invention.

Vulcanized fiber is usually furnished to the trade in the form of sheets of the required dimensions.

I take these sheets, chamfer the edges, partially dissolve them by a treatment of chloride of zinc, shape the vessel upon a mandrel, and cement the overlapping edges together by heat and pressure.

The tube thus formed is wetted to wash out the chloride of zinc, its edges turned over by hand so as to form a bead or flange, and it is then slipped upon a mandrel and slowly and carefully dried.

This turning of the edges may be done over a loop or wire, or a band of the vulcanized fiber, and assists greatly in strengthening the vessel, while giving it an ornamental appearance.

The tube, when wetted and its edges turned over, as above described, is placed upon a former or mold, which is made in sections, so as to be collapsible, to permit of its removal after the tube is dried, as it shrinks in drying and conforms closely to the shape of the mold.

A bottom is then cut out, by preference of the same material, although other well-known materials might be used, and secured at or near one end of the tube by riveting, cementing, or gluing in well-known ways.

The vessels might obviously be made polygonal, as well as round, and of any desired depth and width, and are especially adapted for baskets, measures, cans, &c., for holding dry materials. It is obvious that these vessels might also readily be made tight enough to hold liquids.

What I claim as my invention, and desire to secure by Letters Patent, is—

A vessel constructed of vulcanized fiber, having flanged or beaded ends of the same material, and a bottom secured therein, substantially in the manner set forth.

In testimony whereof I have hereunto subscribed my name.

W. COURTENAY.

Witnesses:
FRANCIS P. BURKE,
GEO. WAGNER.